Figure 1:
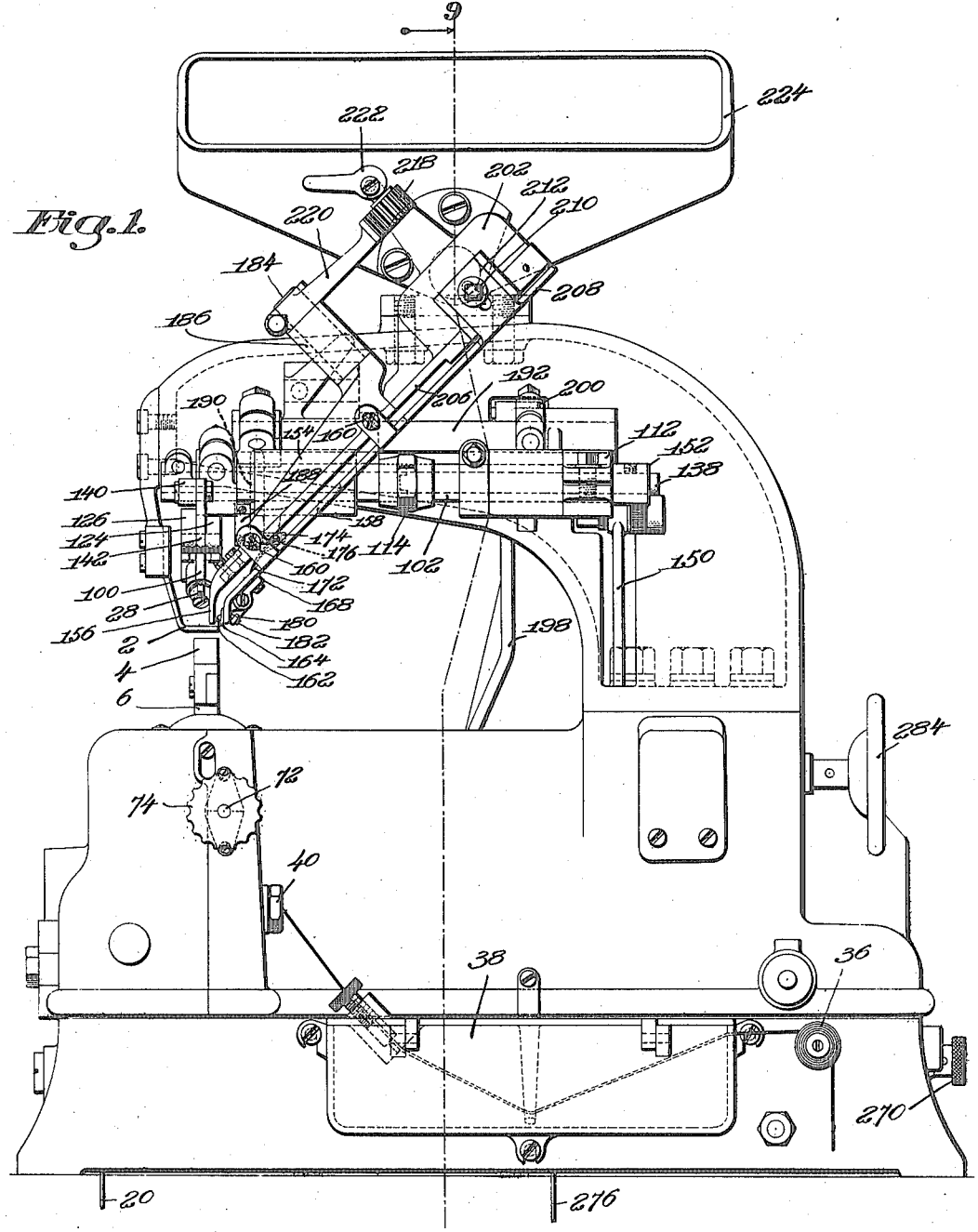

B. T. LEVEQUE.
BUTTON ATTACHING MACHINE.
APPLICATION FILED JULY 17, 1916.

1,263,441.

Patented Apr. 23, 1918.
10 SHEETS—SHEET 1.

Witness
Frederick S. Greenbaf

Inventor
Bernard T. Leveque
by
Phillips Van Everen & Fish
Attys

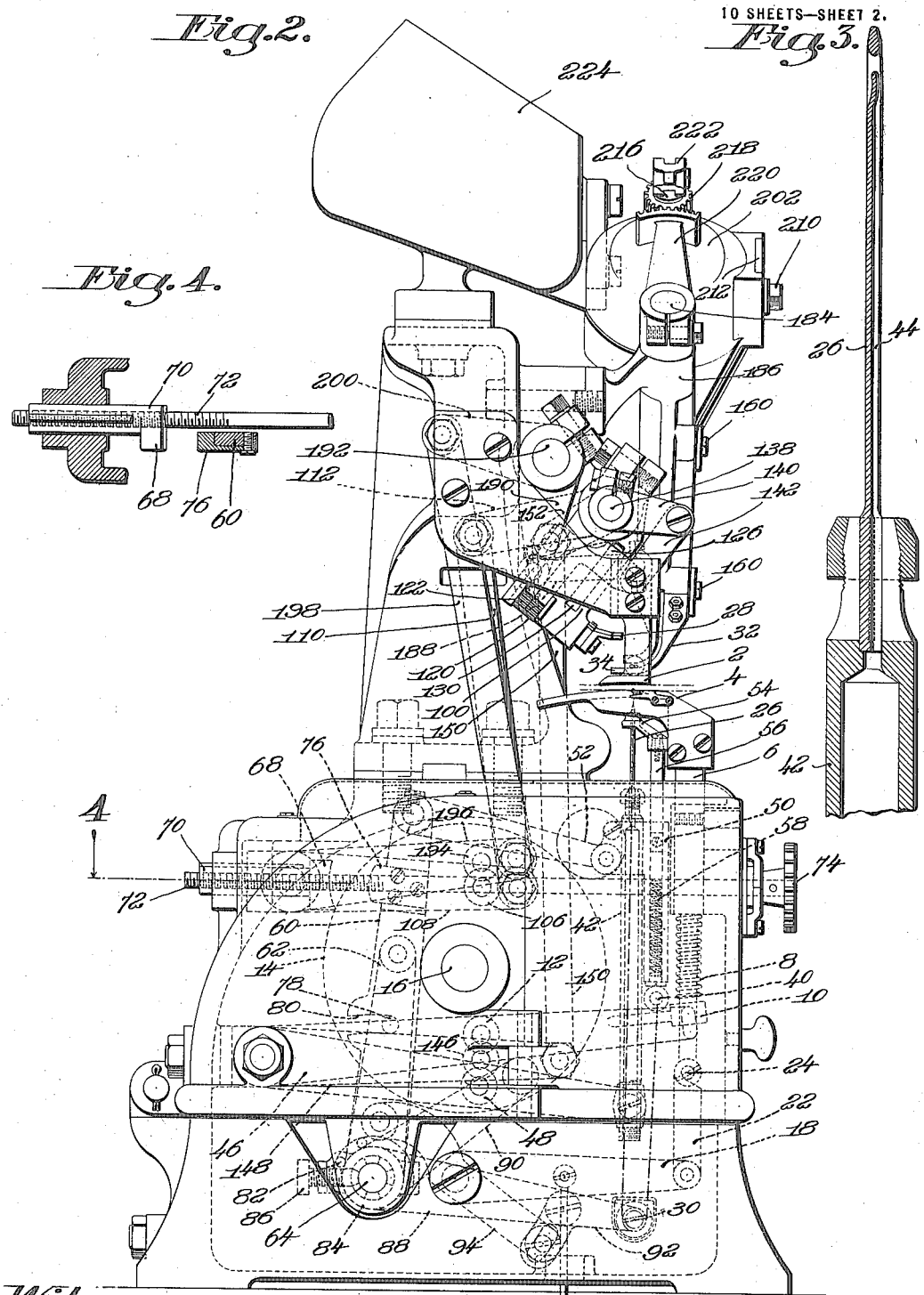

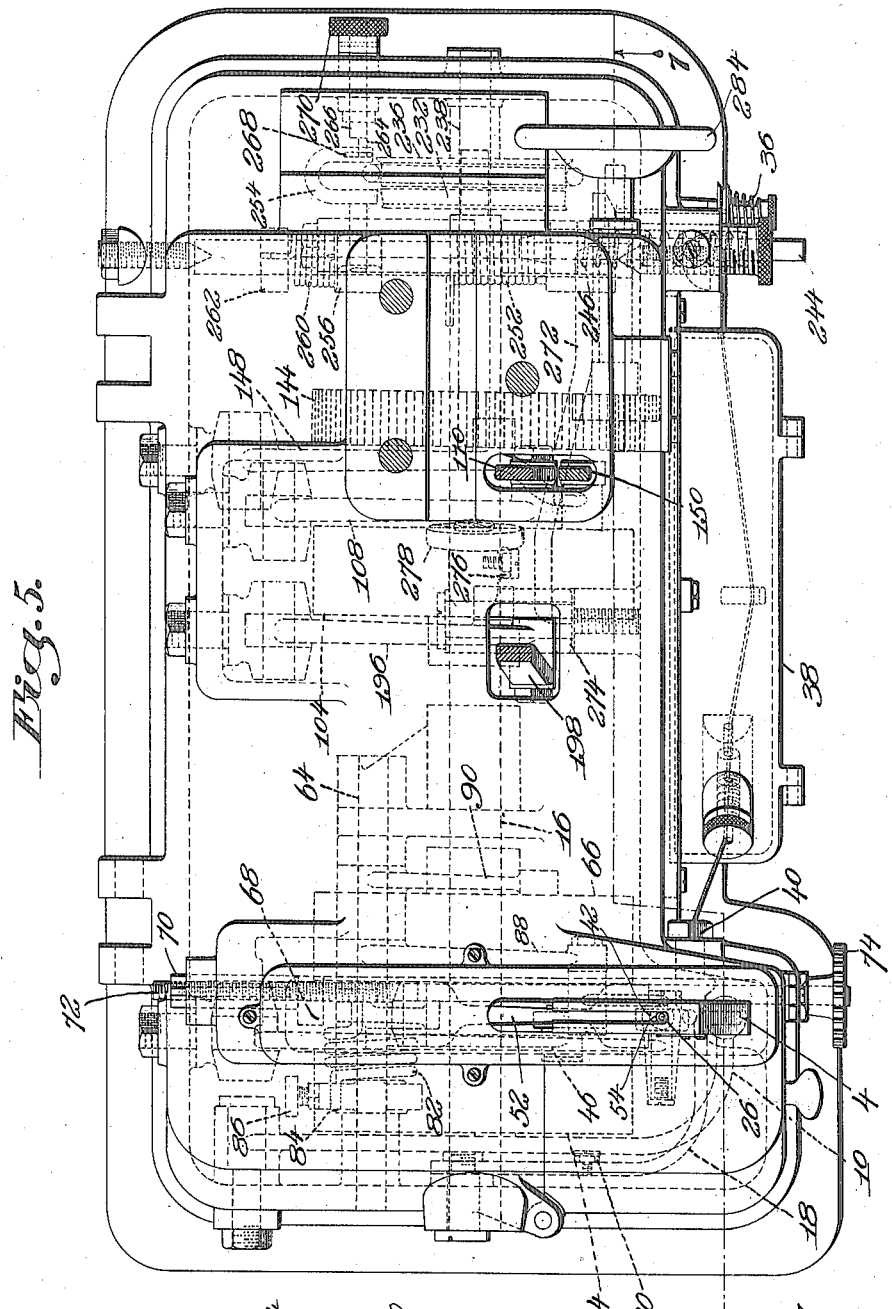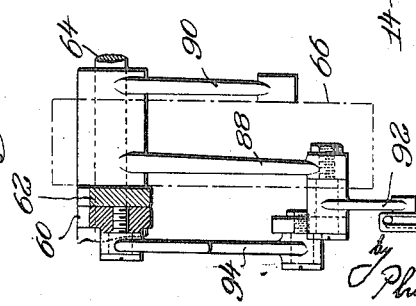

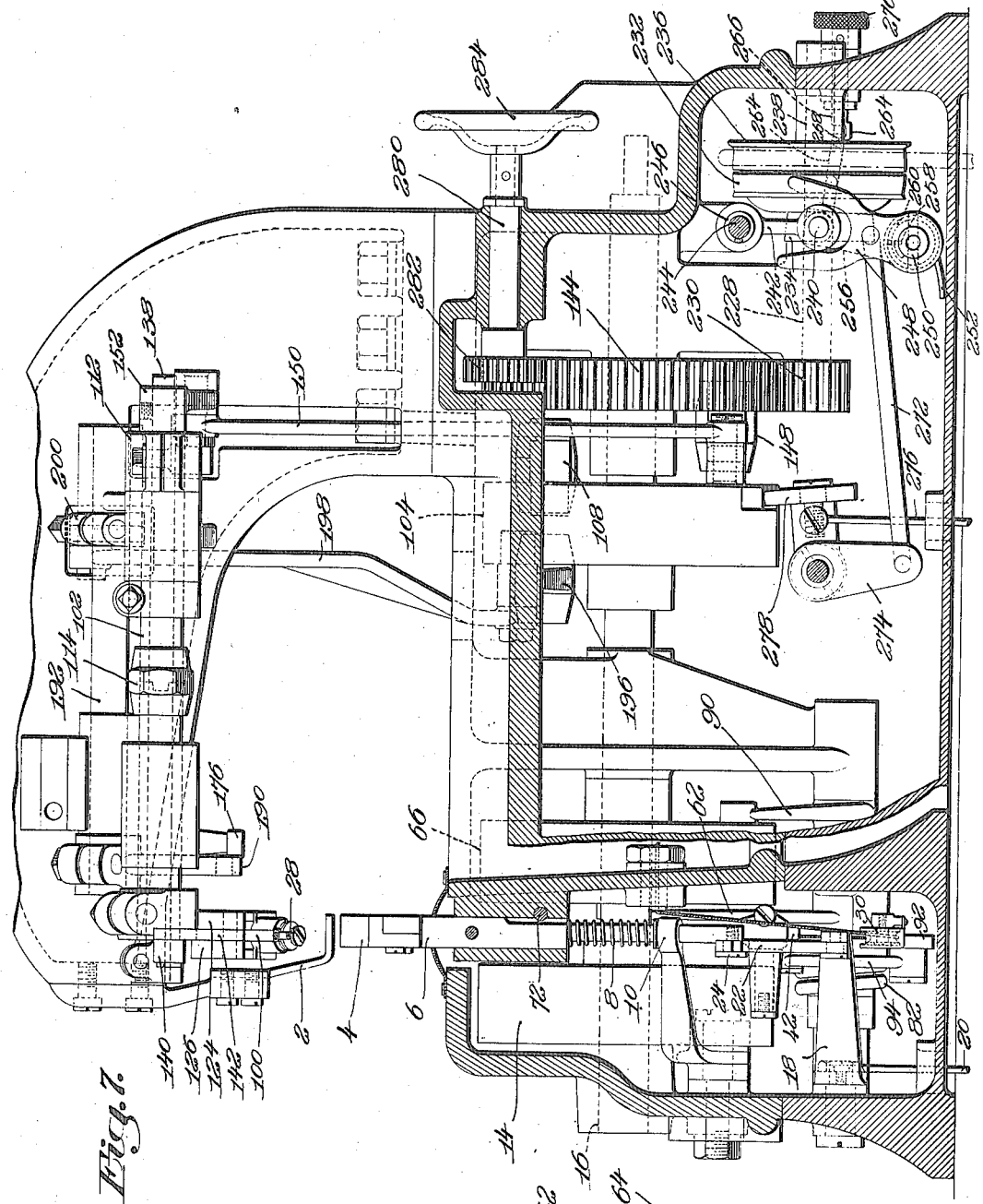

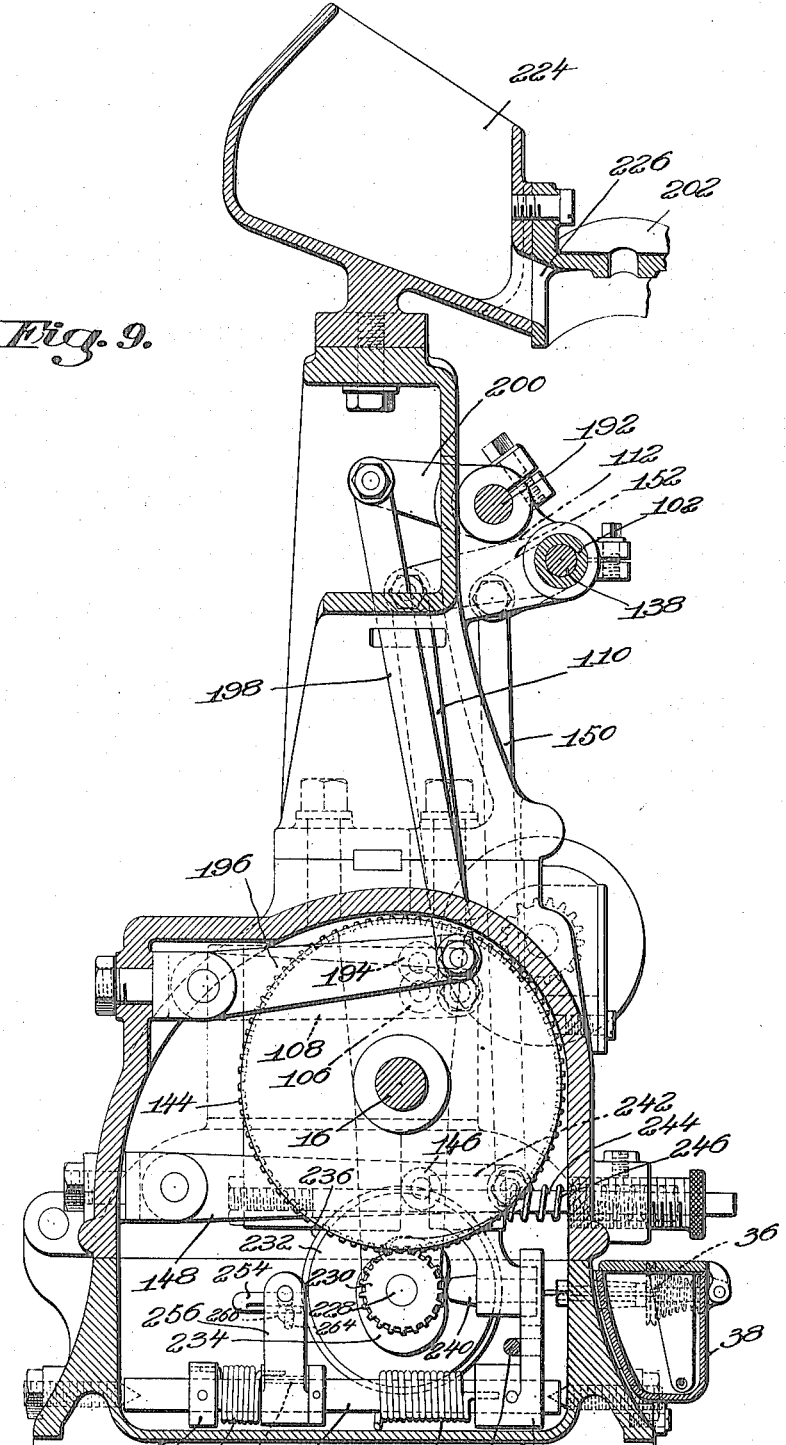

B. T. LEVEQUE.
BUTTON ATTACHING MACHINE.
APPLICATION FILED JULY 17, 1916.
1,263,441.
Patented Apr. 23, 1918.
10 SHEETS—SHEET 6.
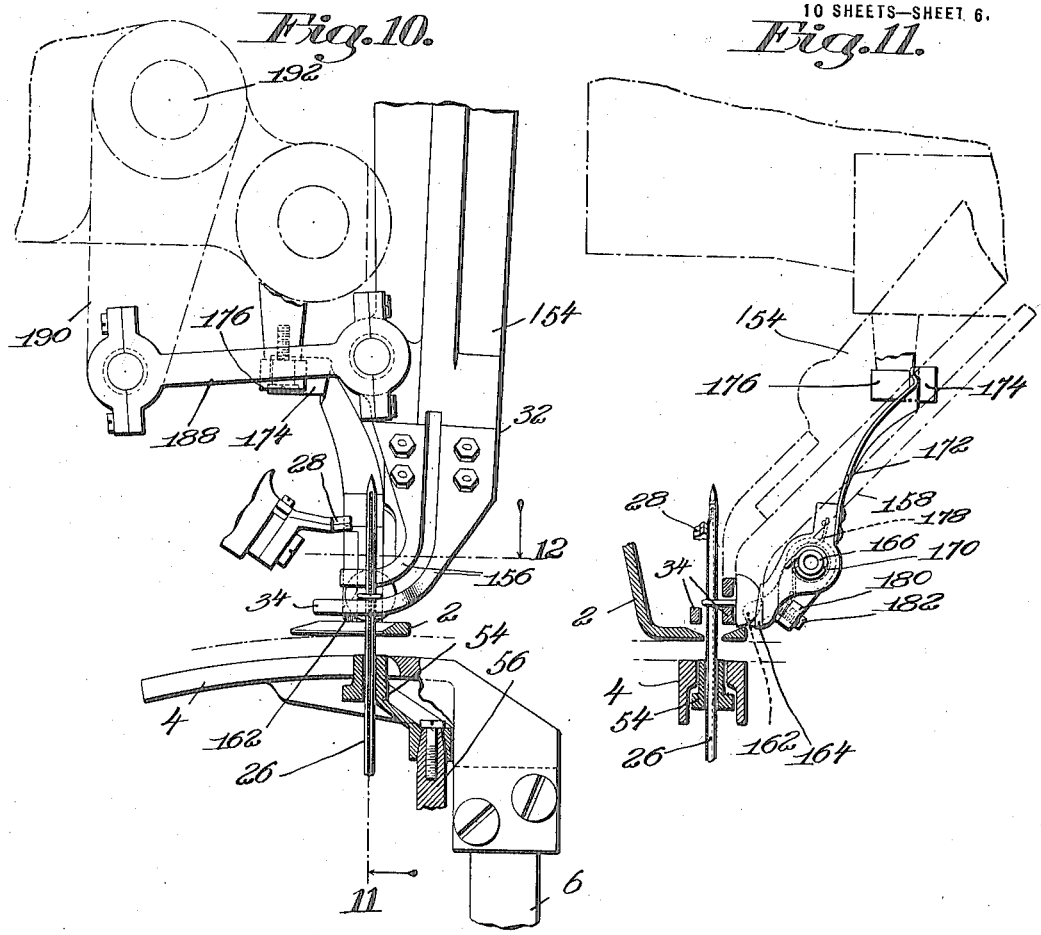
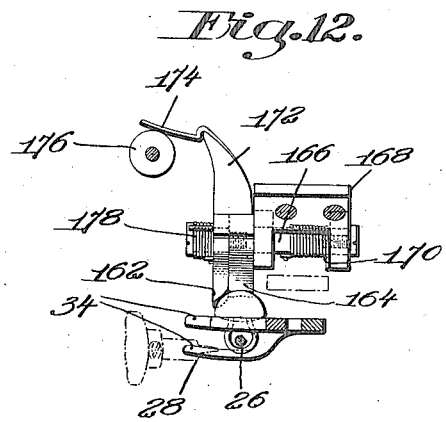

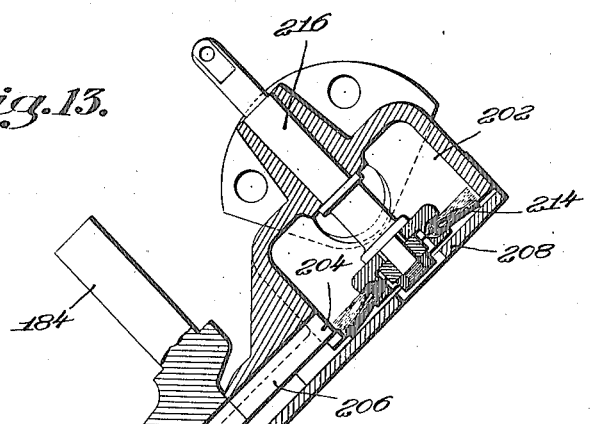
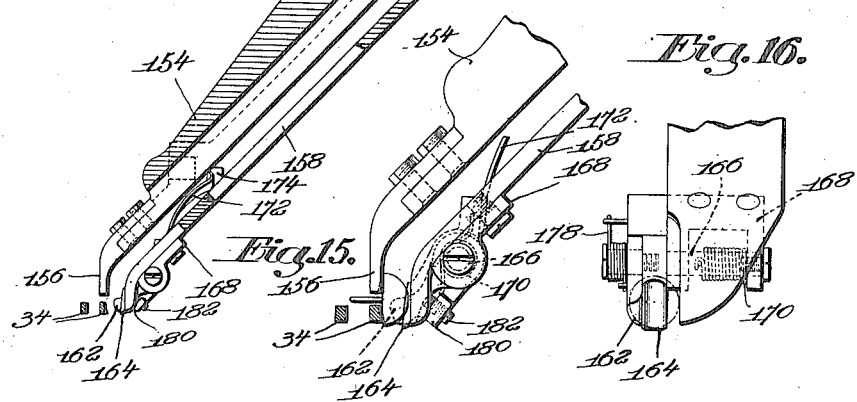
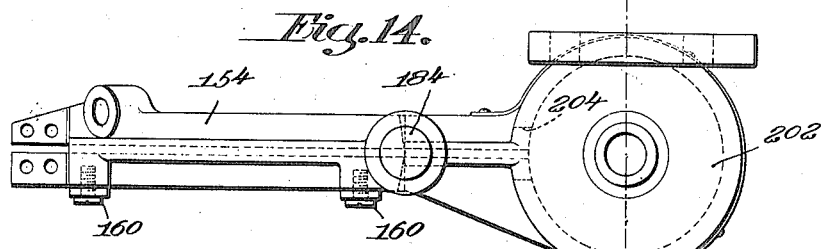
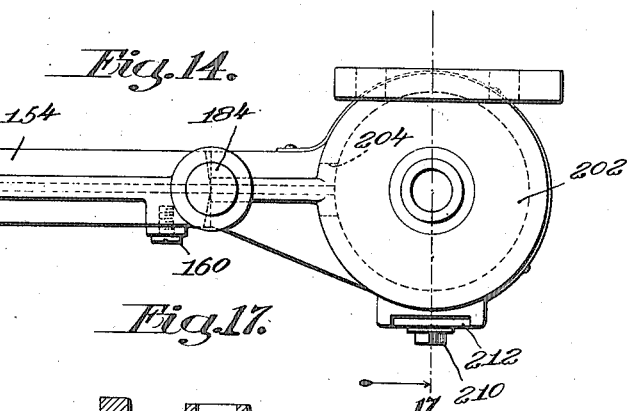
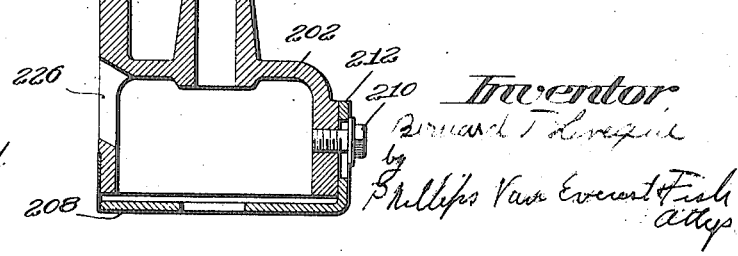

B. T. LEVEQUE.
BUTTON ATTACHING MACHINE.
APPLICATION FILED JULY 17, 1916.
1,263,441.
Patented Apr. 23, 1918.
10 SHEETS—SHEET 8.
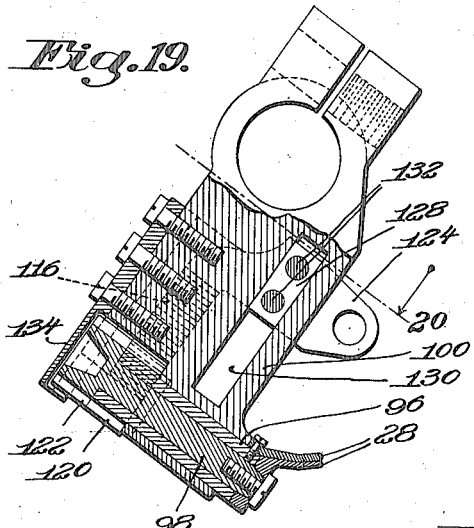
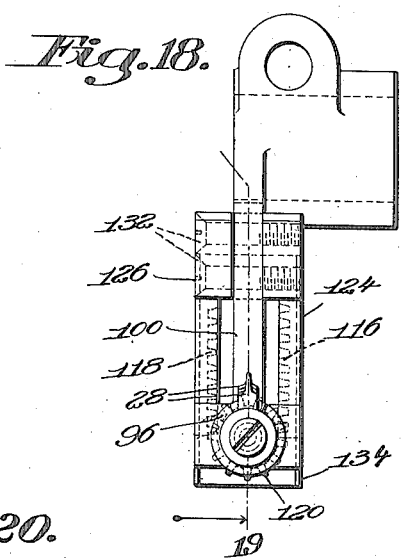
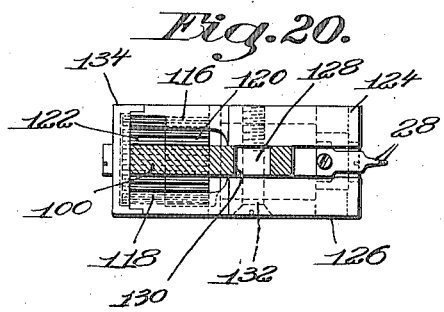

B. T. LEVEQUE.
BUTTON ATTACHING MACHINE.
APPLICATION FILED JULY 17, 1916.

1,263,441.

Patented Apr. 23, 1918.
10 SHEETS—SHEET 9.

Witness
Frederick L. Greenleaf

Inventor
Bernard T. Leveque
by Phillips Van Everen + Fish
attys.

B. T. LEVEQUE.
BUTTON ATTACHING MACHINE.
APPLICATION FILED JULY 17, 1916.

1,263,441. Patented Apr. 23, 1918.
10 SHEETS—SHEET 10.

Witness
Fredrick S. Grumbaf.

Inventor
Bernard T. Leveque
by Phillips Van Everen & Fish
attys

UNITED STATES PATENT OFFICE.

BERNARD T. LEVEQUE, OF WENHAM, MASSACHUSETTS, ASSIGNOR, BY MESNE ASSIGNMENTS, TO UNITED SHOE MACHINERY CORPORATION, OF PATERSON, NEW JERSEY, A CORPORATION OF NEW JERSEY.

BUTTON-ATTACHING MACHINE.

1,263,441.   Specification of Letters Patent.   Patented Apr. 23, 1918.

Application filed July 17, 1916. Serial No. 109,694.

*To all whom it may concern:*

Be it known that I, BERNARD T. LEVEQUE, a citizen of the United States, residing at Wenham, in the county of Essex and State of Massachusetts, have invented certain new and useful Improvements in Button-Attaching Machines; and I do hereby declare the following to be a full, clear, and exact description of the invention, such as will enable others skilled in the art to which it appertains to make and use the same.

The invention relates to machines for sewing shank eyed buttons to shoe uppers or other articles to which it may be desired to attach them, and more particularly to machines in which the button attaching loops or stitches are locked or anchored by the button.

Machines of this type heretofore in commercial use are provided with button sewing and work feeding mechanisms operating to attach a series of spaced buttons, a button being attached and the work fed during each cycle of the machine. Whenever a "skip" occurs, *i. e.* whenever because of a defective button or for any other reason the machine fails to attach a button, the feed of the work during that cycle results in the omission of a button in the series. The work must therefore be re-positioned or replaced in the machine, after the sewing of the series is completed, and operated to attach a button in the blank space or spaces caused by the "skip" or "skips." It is one object of the present invention to eliminate this objectionable feature, and to this end the invention contemplates the provision of button attaching and work feeding mechanisms for attaching a series of spaced buttons which are so constructed and operated that upon the occurrence of a "skip" the feed of the work will be discontinued until a button is attached. There will be no feed, therefore, during the cycle in which a "skip" occurs, and the work will remain in such position that during the succeeding cycle a button may be attached in proper sequence in the series without delay or manipulation by the operator. In the preferred construction the work is fed through the thread leading from the attached button, and the thread handling devices of the sewing mechanism are constructed to so handle the thread that it will be in the proper relation for them to form and tighten the button attaching loops during the cycle following that in which a skip occurs. The work feeding mechanism in this construction is dependent for its feeding action upon the attachment of a button, so that no feed will take place until a button is attached, while the thread handling devices will idly handle the thread during the cycle in which a skip occurs, and stand ready at the end of that cycle to properly handle the thread in attaching a button during the succeeding cycle. The work feeding means may comprise any suitable device acting through the thread, but for the sake of simplicity of construction, and reduction in the number of parts, it is preferred to feed the work by moving the needle in the direction of feed while the thread is held taut, so that movement is imparted to the work through the thread leading from the eye of the needle to the attached button.

A further object of the invention is to improve and simplify button attaching mechanisms which pass a primary loop through the eye of a button and a secondary loop through the primary loop outside the eye and over the button head. To this end a feature of the invention contemplates taking the primary loop from the needle by looper fingers which enter the loop and are subsequently moved and separated to spread the loop laterally and hold it open for the passage of the needle and the secondary loop therethrough. This enables the primary loop to be spread sufficiently to insure the proper passage of the secondary loop, even should the needle be somewhat deflected from its proper path. A further feature of the invention contemplates taking the secondary loop from the needle by similar and preferably the same looper fingers, which are subsequently separated to laterally spread the loop, and are then moved toward each other to carry the loop over the button head and to hold the loop taut during its contraction. This insures the proper location of the loops with relation to each other and to the button shank to tightly attach the buttons when the loops are drawn into final position by the takeup. A further feature contemplates the provision of a button pushing device which pushes the button head toward the bight of the primary loop as the secondary loop is being carried over the head by the looper fingers, and coöperates with the fingers in insuring the proper location and tightening of the loops against the work below the button shank. This pushing device is preferably carried by the vibrating chute or raceway which presents the button to the sewing mechanism, although such construction is not essential. A further feature of the invention contemplates so arranging and operating the devices for spreading the secondary loop that the side of the loop leading to the eye of needle will extend substantially lengthwise of the needle during the spreading of the loop, and will not therefore subject the needle to a material bending strain. This is preferably accomplished by operating the loop spreading devices to spread the loop after the needle has so far retracted that the thread leading from the needle eye to the spreading devices will either be in line with the needle, or at such an acute angle thereto, that the tension on the thread will not subject the needle to any substantial lateral strain. A further feature contemplates pushing the button through the secondary loop after the needle has been so far retracted that all danger of bending the needle by engagement of a button therewith will be eliminated. This is preferably accomplished by withdrawing the needle into or below the work before the button is pushed through the secondary loop.

Further objects of the invention are to provide novel and improved means for adjusting the work feed for different spacings of buttons; to provide novel and improved needle actuating mechanism; to provide novel and improved takeup mechanism; and to otherwise improve and simplify the various parts and mechanisms of the machine. To these ends the invention comprises, in addition to the features outlined above, certain further features of construction and combinations of parts hereinafter described and referred to in the claims, the advantages of which will be apparent to those skilled in the art from the following detailed description of a machine embodying the various features of the invention in their preferred forms.

In the drawings, Figure 1 is a front elevation of a machine embodying the preferred form of the invention; Fig. 2 is an end elevation looking toward the right in Fig. 1; Fig. 3 is an enlarged vertical section through the needle and upper end of the needle bar; Fig. 4 is a sectional detail on line 4, Fig. 2, showing the feed adjusting stop; Fig. 5 is a plan view, the overhanging arm carrying the button feeding and looper mechanism being removed; Fig. 6 is a detail plan view showing the takeup and its operating mechanism; Fig. 7 is a vertical sectional view on the broken line 7—7 of Fig. 5; Fig. 8 is a sectional detail showing a part of the work feed mechanism; Fig. 9 is a vertical sectional view on line 9, Fig. 1; Fig. 10 is a detail elevation showing the parts about the lower end of the button chute; Fig. 11 is a sectional view on line 11, Fig. 10, parts of the button chute being indicated in dotted lines; Fig. 12 is a sectional detail on line 12, Fig. 10; Fig. 13 is a vertical sectional view through the center of the button delivery hopper and button chute; Fig. 14 is a plan view of the parts shown in Fig. 13; Fig. 15 is a detail view showing the lower end of the button chute; Fig. 16 is a detail view looking toward the right in Fig. 15, the front plate of the chute being removed; Fig. 17 is a sectional view on line 17, Fig. 14; Fig. 18 is a detail view of the looper carrier; Fig. 19 is a sectional view on line 19, Fig. 18; Fig. 20 is a sectional view on line 20, Fig. 19; and Figs. 21 to 48 are diagrammatic views illustrating the mode of operation of the thread handling devices in attaching a button.

In the machine shown the work is held during the attachment of the button between a stationary presser foot 2, provided on its upper side with a button alining trough, and a vertically movable work clamp 4, which is slotted in the direction of feed in the usual manner. The work clamp is carried on the upper end of a vertically movable bar 6 which is forced upward to clamp the work through a spring 8 interposed between a shoulder on the bar and the forward end of an operating lever 10 which carries a roll 12 engaging a cam groove in a cam disk 14 secured to the cam shaft 16 of the machine. The cam operates to relieve the pressure on the spring 8 during the feed of the work, and to apply pressure to the spring during the attaching of the button. The work clamp may be drawn downward to permit the insertion or removal of the work through an arm 18 connected by a rod 20 with a treadle, and connected with the lower end of the bar 6 by a link 22, the upper end of which is adapted to hook over a pin 24 on the bar.

The thread handling devices comprise a vertically reciprocating and laterally movable eye pointed needle 26 for passing a primary loop through the work and through a button eye, and for passing a secondary loop through the work and through the primary loop outside the eye, a looper consisting of two looper fingers 28 which are operated to take the primary loop and spread it for the passage of the secondary loop therethrough, and to take the secondary loop, spread it and pass it over the button head, and a takeup 30 for controlling the thread and for taking up and tightening the loops. The button feeding means includes a button chute 32 which holds the button at its lower end in position for the passage of the needle through the button eye, and which is swung in the line of feed to withdraw the par-
tially attached button from the chute. In the construction shown, the lower end of the chute also carries two button pushing fingers 34 which operate to push the button head toward the bight of the primary loop, and coöperate with the looper fingers in passing the secondary loop over the button head. The needle thread is led through a tension device 36, a wax pot 38 and thread guide 40 to the takeup 30, from which it passes up through the needle bar to the eye of the needle.

Figure 21:
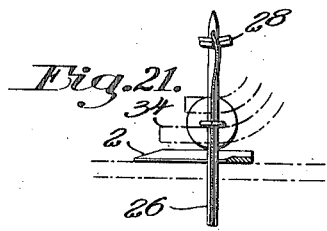
Figure 22:
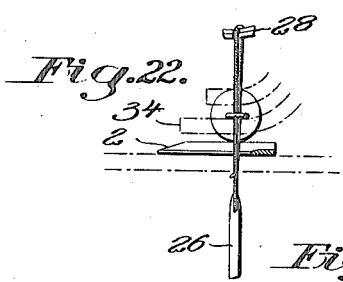
Figure 23:
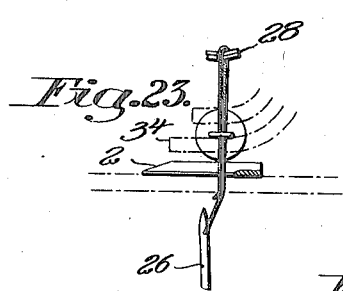
Figure 24:
Figures 25, 26:
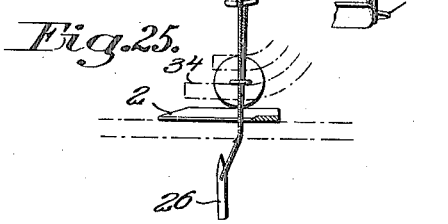
Figure 27:
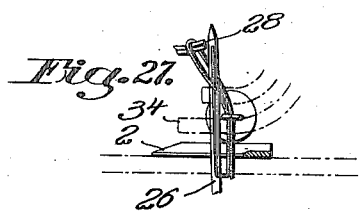
Figure 28:
Figures 29, 30:
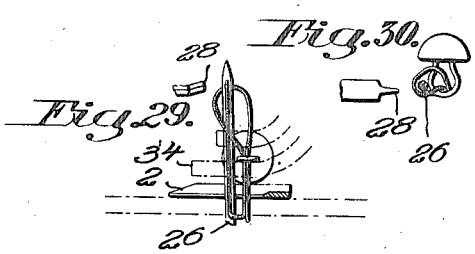
Figure 31:
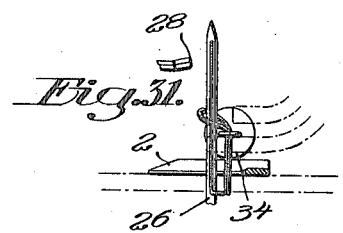
Figure 32:
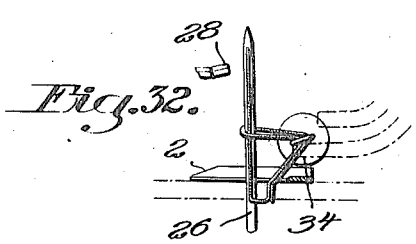
Figure 33:
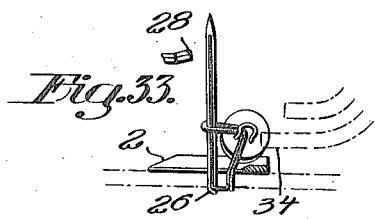
Figure 34:
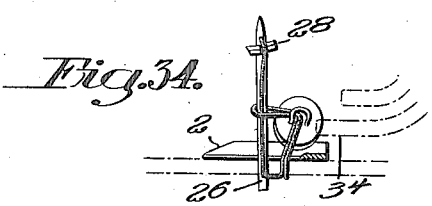
Figure 35:
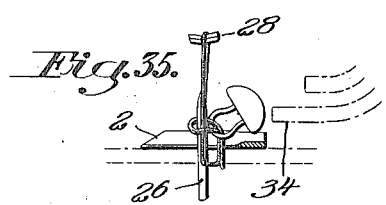
Figures 36, 37:
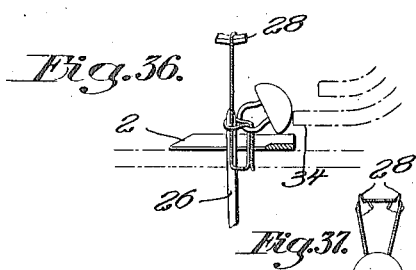
Figures 38, 39:
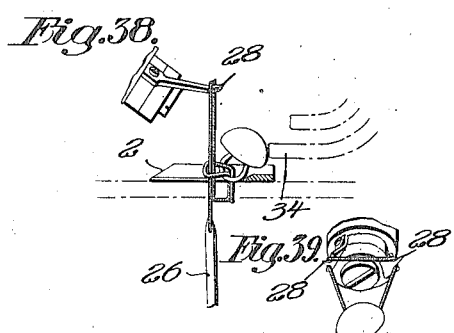
Figures 40, 41:
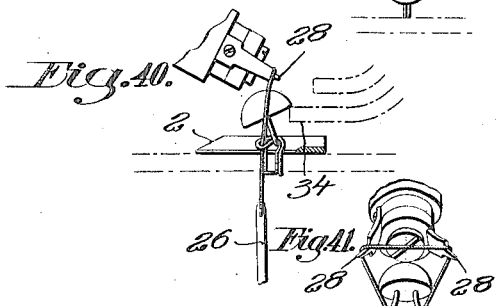
Figure 42:
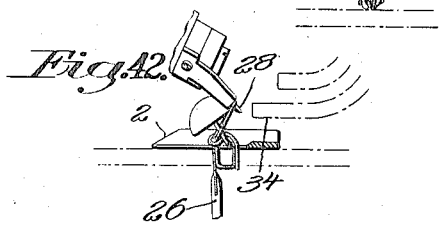
Figure 43:
Figures 44, 45:
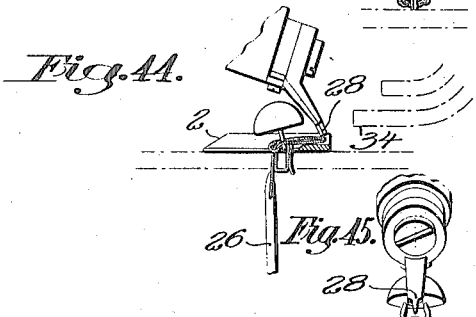
Figure 46:
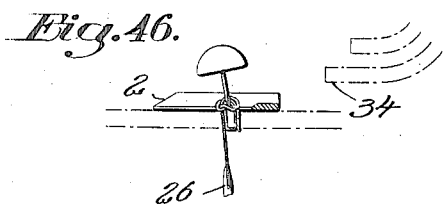
Figure 47:
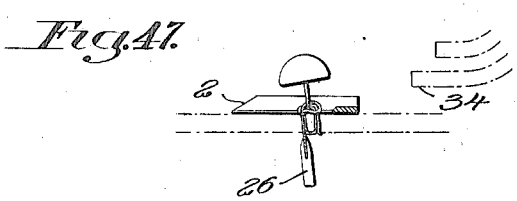
Figure 48:
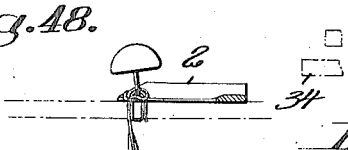

The mode of operation in attaching a button is clearly illustrated in Figs. 21 to 48. During the first or primary upward stroke of the needle it passes a loop of thread up through the work and through the eye of a button which at this time is held in proper position by the button chute. During the upward stroke of the needle the takeup moves to give up thread to the needle, so that the thread is not under tension during the formation of the loop. As the needle starts down it throws out a loop, and the looper fingers 28, which at this time are located one above the other, advance or move toward the operator and enter the loop, as indicated in Fig. 21. As the needle retracts into the position of Fig. 22, the looper fingers are separated to spread the primary loop, as indicated in Figs. 23 to 26. After the needle has been retracted it moves laterally away from the operator, or in the direction of the feed, and is then again advanced to carry the secondary loop through the work. Meanwhile the looper fingers 28 move in the direction of the feed, carrying the spread primary loop into the position indicated in Figs. 27 and 28, so that during the secondary upward stroke of the needle a widely open loop is presented, through which the needle carries the secondary loop, as also indicated in Figs. 27 and 28. During the latter part of the upward stroke of the needle, the looper fingers are moved toward each other into initial position, and are withdrawn from the primary loop, as indicated in Figs. 29 and 30, so that during the latter part of the upward stroke of the needle it withdraws part of the slack thread from the primary loop. During the secondary upward stroke of the needle the takeup moves to give up thread to the needle, so that there is no tension on the thread while this loop is being formed, and no reeving of the thread through the eye of the needle while under tension. It is not necessary, therefore, to provide a thread groove on that side of the needle along which the thread leads to the primary loop, and the thread will be held by the work against its ungrooved side of the needle, so that when the needle dips, a better and more certain looping of the thread will be secured than with the usual construction of needle having a groove on this side within which the thread lies, and which relieves the pressure of the material on the thread where it passes through the needle hole. After the needle has passed the secondary loop through the primary loop, the button chute is retracted or moved toward the operator, so that the button strung on the primary loop is withdrawn from the end of the chute and falls down into the trough in the upper side of the presser foot, as indicated in Figs. 31 to 33. After the button has been thus withdrawn from the chute, the needle starts down, throwing out a loop, and the looper fingers again advance and enter this secondary loop, as indicated in Fig. 34. As the needle moves downward the looper fingers are separated to spread the secondary loop, and the takeup moves to draw up the primary loop so that as the needle completes its downward stroke the primary loop is drawn down against the work, and its bight drawn tightly against the secondary loop (Figs. 35 to 39). This draws the shank of the button down against the work, and draws the head of the button into the trough, the converging sides of which act to substantially aline the button with the secondary loop. The spreading movement of the looper fingers does not begin until the needle has been retracted sufficiently to bring its upper end below the looper fingers and below the bight of the loop held by the fingers, so that the thread will lead from the needle eye to the looper fingers substantially lengthwise of the needle during the spreading of the loop and during the continued retraction of the needle. After the needle has withdrawn into and below the work, the thread leads lengthwise of the needle up through the needle hole and to the looper fingers. The strain on the needle, due to the pull on the thread during the spreading of the loop, is therefore a lengthwise or an approximately lengthwise strain, rather than a transverse strain tending to bend the needle. The looper fingers continue to separate and to move downward until the loop is fully spread, as indicated in Figs. 40 and 41. Meanwhile the button chute moves forward, bringing the button pusher fingers 34 into engagement with the button head, so that these fingers center the button and push it toward the bight of the primary loop and in a direction to pass it through the laterally spread secondary loop. The needle having been retracted below the work, there is no danger of bending it during this operation. As the pushers push the button, the looper fingers continue to move downward, and also move toward each other and forward in a direction to carry the secondary loop over the button head. During this movement of the looper fingers the takeup continues to move downward and draws thread through the tension. The looper fingers therefore retain positive control of the secondary loop, which is held taut during its contraction, and move down over the button head until they come substantially together and deliver the bight of the secondary loop just before its contraction or taking up is completed, and in such position that the tightening of the loop below the button shank and close to the work is insured. As the looper fingers move forward and downward over the button head during the contraction of the secondary loop, the button chute is gradually retracted to withdraw the button pusher fingers 34 from the path of the looper fingers, as indicated in Figs. 42 to 45. The takeup continues to move downward, and finally tightens the knot formed by the primary and secondary loops (Fig. 46), and draws thread through the tension to be given up in forming the succeeding primary and secondary loops. The needle then rises until its point is just clear of the last needle hole, as indicated in Fig. 47, and is then moved laterally away from the operator by the feed mechanism to space the work for the attachment of the succeeding button. During this lateral movement of the needle the takeup continues to draw thread through the tension holding the thread taut so that the work is fed through the thread leading from the eye of the needle to the attached button, as indicated in Fig. 48. During the feed the takeup pulls an amount of thread through the tension equal to the feed, and as the needle moves back into initial position, ready for the next cycle, the takeup gives up this thread, so that there is no material strain or pull on the thread as the needle moves back after its work feeding movement. After the feed of the work the button chute is advanced to present the succeeding button in proper position, and the looper fingers are returned to their initial position. The parts are now in position ready for the next button attaching cycle.

If for any reason a "skip" occurs, so that no button is attached during the button attaching cycle, the loop or loops which may be in the work as the needle is retracted after passing the secondary loop through the work will be withdrawn by the takeup, or by the takeup and the lateral feeding movement of the needle, since the loops, although they may be formed and manipulated in the regular way during the cycle, will not be anchored or locked unless a button has been attached. The position of the work will not therefore be affected by the lateral feeding movement of the needle, which will merely move idly along the thread leading from the previously attached button, and will then return into initial position, and the thread at the end of the cycle in which the "skip" occurs will be in the same relation to the parts that it was at the beginning of the cycle, and will be in proper relation to the thread handling devices for forming and tightening the button attaching loops in regular course in the succeeding cycle. The feed of the work will therefore be interrupted or discontinued whenever a "skip" occurs, and will be resumed upon the attachment of the button in a subsequent cycle, without delay and without necessity of any re-threading or manipulation on the part of the operator.

The needle is secured in the upper end of a hollow needle bar 42, and the groove 44 in the side of the needle through which the thread passes to the needle eye extends down through the shank of the needle and communicates directly with the upper end of the hole in the needle bar, so that the thread may lead in a substantially straight line up through the needle bar and to the eye of the needle (Figs. 2 and 3). The takeup 30 is preferably mounted directly below the lower end of the hollow needle bar, so that there will be a substantially direct pull on the thread from the takeup to the needle hole in taking up and tightening the loops, and consequently no lateral pull tending to deflect the needle. The needle will also slide freely down the thread during its downward movement, even though the thread may be under tension.

The lower end of the needle bar is pivotally supported upon the free end of a substantially horizontal lever 46 provided with a cam roll 48 engaging a cam groove formed in the rear face of the cam disk 14, and acting to give the proper vertical movements to the needle bar and needle. The upper end of the needle bar is secured in a block 50, and this end of the needle bar is supported and guided during its vertical movements by a support in the form of a link 52 pivotally connected to the block. A needle guard 54 surrounds the needle below the work clamp, and is carried by the upper end of a bar 56 mounted to slide in the block 50, and supported by a spring 58. The upper side of the needle guard is shaped to pass through the slot in the work clamp and press against the under surface of the work when the needle bar is raised to force the needle through the work. After the needle guard engages the work, the spring 58 yields during the upward stroke of the needle bar, and expands during the first part of the downward movement of the needle bar, and supports the work about the needle hole. This aids in insuring the proper looping of the thread during the first part of the downward movement of the needle. The guard also supports the needle close to the eye during the feeding stroke of the needle, and supports the needle against the pull of the thread during the feed.

The work feeding mechanism comprises a substantially vertical feed arm 60, to the upper end of which the supporting link 52 is pivotally connected. The lower end of the feed arm is provided with a hub surrounding the hub of a feed cam lever 62, which is mounted to swing on a fixed shaft 64 (Figs. 2, 7 and 8), and is connected to actuate the feed arm. The feed cam lever carries a roll engaging a cam groove formed in the front face of a cam disk 66 which is secured to the cam shaft 16. The cam serves not only to actuate the feed arm in imparting the feeding movements to the needle bar, but also acts through the feed arm and supporting link 52 to so control the path of movement of the upper end of the needle bar that the needle will move in a straight line during its reciprocations. The cam also acts through the feed arm and supporting link 52 to move the needle bar laterally between the primary and secondary strokes of the needles.

In order that the feed of the work may be readily adjusted to vary the spacing of the buttons, an adjustable stop 68 is provided for limiting the feeding stroke of the feed arm 60, and a yielding connection is provided between the feed cam lever and feed arm which will yield to allow the feed cam lever to complete its full stroke after the movement of the feed arm is arrested by the stop. As shown, the stop 68 is formed on a slide 70 engaged by the screw-threaded rear end of an adjusting shaft 72 which extends through the front side of the machine casing, and is provided with an operating head 74 within convenient reach of the operator. The stop 68 is arranged to be engaged by a coöperating block 76 secured to the feed arm. The connection between the feed cam lever and feed arm comprises a pin 78 projecting from the feed cam lever into a slot 80 in the feed arm, and a torsional spring 82 surrounding the hub of the feed arm and having one end engaged with the feed arm and the other engaged with a collar 84 adjustably secured on the hub of the feed cam lever. The collar 84 is secured in adjusted position by a screw 86 passing through the collar and having a conical end adapted to enter any one of a series of holes formed in the hub of the feed cam lever. With this construction the throw of the feed cam lever is constant and sufficient to give the maximum feed to the work. When the feed is less than the maximum the feed arm will accompany the feed cam lever in its movement toward the left in Fig. 2 until the movement of the feed arm is arrested, and thereafter the spring 82 will yield to allow the feed cam lever to complete its stroke, the pin 78 moving idly away from the end of the slot 80. On the return movement of the feed cam lever it will move idly until the pin 78 reaches the end of the slot 80, when it will pick up the feed arm, and thereafter the arm and lever will move together into initial position.

The takeup 30 is in the form of a roll over which the thread may pass freely, and is carried on the end of a lever 88 which is mounted on the shaft 64. The lever is provided with an arm 90 carrying a roll which engages a cam groove in the rear face of a cam disk 66, and shaped to give the takeup the proper up and down movements to give up thread to the needle during the formation of the primary and secondary loops, and to tighten these loops and draw thread through the tension to be given up in forming the succeeding loops.

As above explained, the takeup operates not only to tighten the loops and draw thread for the succeeding loops, but also acts to draw through the tension the thread which extends from one button to another. The amount of thread drawn by the takeup for this purpose should vary in accordance with the feed. In the construction shown the takeup is accordingly so connected with the feed mechanism that its action is varied in accordance with the feed. As shown, the takeup roll is mounted on the end of a bell crank lever 92 pivoted on the end of the takeup actuating lever 88 and connected by means of a link 94 with the feed arm 60. With this construction the bell crank lever 92 will be swung during the feeding stroke of the feed arm in a direction to draw thread through the tension, and during the return stroke of the feed arm will be swung in a direction to give up this thread. The movement imparted to the takeup will depend upon the movement imparted to the feed arm, and any variation in the stroke of the feed arm will result in a corresponding variation in the movement of the takeup.

The looper fingers 28 in the construction shown project obliquely from the ends of two concentric shafts 96 and 98, which are mounted in a looper carrying lever 100, so that by turning the shafts in opposite directions the looper fingers may be separated and brought together, and by swinging the carrier lever as the shafts are turned, the looper fingers may be given the movements requisite to handle the thread in the manner already described. As shown, the shaft 96 is in the form of a sleeve surrounding the shaft 98, and the shafts are arranged at an inclination so that the looper fingers projecting obliquely from the ends of the shafts will be brought by a semi-rotation of the shafts in opposite directions from position to enter and hold the loops into the approximately vertical position where they will shed the secondary loop, and will, as the looper carrier swings forward, move in a path to carry the opposite legs of the loop down over the opposite sides of the head, as already described with reference to Figs. 35 to 45.

The looper carrier lever is secured upon the forward end of a hollow shaft 102 which is rocked to impart proper movement to the looper carrier by a cam formed in the rear face of a cam disk 104, and engaging a roll 106 on a lever 108, the end of which is connected by a link 110 with an arm 112 secured to the rear end of the shaft. The shaft may for convenience be made in two sections held together by a coupling 114.

The looper shafts 96 and 98 are rotated by racks 116 and 118 arranged to engage pinions 120 and 122 formed on the rear ends of the shafts. The racks are formed on plates 124 and 126 arranged on opposite sides of the carrier lever, and connected by a lug 128 projecting from the plate 124 through a guide slot 130 in the carrier lever. The plate 126 is secured to the face of the lug 128 by screws 132, and the racks are guided and held in engagement with the pinions by a guide plate 134 secured to the rear edge of the carrier lever and provided with flanges engaging grooves formed in the rear edges of the plates 124 and 126. The rack slide formed by the plates 124 and 126 is operated to turn the shafts at the proper time and to the proper extent through a rock shaft 138 mounted within the shaft 102 and provided at its forward end with an arm 140 connected with the rack slide by a link 142. The shaft is rocked by a cam groove formed in the front face of a gear 144 which is secured to the cam shaft 16, and engages a roll 146 on an arm 148, the end of which is connected by a link 150 with an arm 152 secured to the rear end of the shaft.

The button chute comprises a front plate 154 grooved to permit the passage of the button shank, and provided at its lower end with two positioning plates 156. The plates 156 are spaced to provide a shank slot between them which curves to present the button shank of the lowermost button in the chute in a horizontal plane (Figs. 10 to 16). The button heads are supported as the buttons pass down the chute by a back plate 158 which is secured to the front plate by screws 160 passing through lugs in the back plate which are slotted so that the back plate may be conveniently adjusted toward and from the front plate in accordance with the size or thickness of the heads of the buttons being operated upon. The lowermost button is positioned in the lower end of the chute by a stop 162 which is engaged by the head of the button and by a clamp 164, which presses the head of the button, after it has engaged the stop, snugly against the positioning plates 156. As shown, the button clamp 164 is provided with a trunnion 166 mounted in bearings formed in a bracket 168 secured to the lower end of the back plate 158. The clamp is forced in a direction to disengage the button head by a torsional spring 170. The clamp is provided with an upwardly projecting spring arm 172, the upper end of which is bent to form a cam 174 which is arranged to engage a fixed roll 176 as the button chute swings into button presenting position. The button stop 162 is pivoted on the clamp 164, and is held normally in position by a torsional spring 178. The stop is provided with a laterally projecting lug 180 which carries an adjusting screw 182 arranged to engage the rear side of the button clamp, and to determine the position of the stop with relation to the front face of the clamp.

When the chute is in button presenting position, as indicated in Figs. 10, 11 and 12, the cam 174 is in engagement with the roll 176, and the clamp is forced yieldingly forward to press the button laterally against the positioning plates 156. When the button chute is swung toward the right in Fig. 10 (toward the front of the machine) to withdraw the button from the chute as above described, the button stop yields to permit the button to pass from the end of the chute, and as the movement of the chute toward the right continues, the cam 174 disengages the roll 176, so that the clamp is swung by the spring 170 back out of the path of the buttons. The lowermost button in the chute then passes down against the stop, where it is in proper position to be carried by the forward movement of the chute into position for the passage of the needle through its shank. The button engaging face of the stop 162 is arranged at substantially an angle of 45° to the plane of the positioning plates, and will properly locate any size of buttons having substantially hemispherical heads, the adjustment of the back plate for any size of button head bringing the stop into proper relation to the positioning plates to correctly locate the button in the chute. In case the machine is to operate upon "Milo" buttons, or similar buttons having flat or disk-shaped heads, an adjustment of the button stop with relation to the clamp will be required, and the proper adjustment may be readily secured by turning the adjusting screw 182.

The button chute is supported by a trunnion 184 formed in line with its upper end and engaging a bearing 186 on the head of the machine. The proper swinging movements are given to the chute to position and withdraw the lowermost button, and to advance and retract the button pushing finger 34 through a link 188 connecting the lower end of the chute with an arm 190 which is secured to the forward end of a rock shaft 192. The rock shaft is actuated by a cam groove formed in the front face of the disk 104 and engaging a roll 194 on a lever 196, the end of which is connected by a link 198 with an arm 200 secured to the rear end of the shaft (Fig. 9).

The buttons are supplied to the upper end of the raceway from a small delivery hopper 202 which is provided on its lower side wall with a button delivery opening 204 shaped to receive a button and forming the mouth of a short guideway 206 which registers with the shank guiding slot of the button chute and delivers to the chute substantially at the axis about which the chute swings. The lower end of the hopper is closed by a base or back plate 208 which registers with and forms a continuation of the back plate 158 of the button chute. The base plate is secured to the hopper by a screw 210 which passes through a slot in a guiding lug 212 projecting from the base plate and guided between ribs on the side of the hopper. The base plate may be readily adjusted for different sizes of buttons, or may be dropped sufficiently to enable all the buttons in the hopper to be discharged between the lower edge of the hopper and the plate. A button agitating brush 214 is mounted within the hopper to play across the delivery opening 204. The brush is secured to the lower end of a shaft 216 which extends up through a bearing in the top of the hopper and carries a pinion 218 at its upper end. The pinion is engaged by a gear segment 220 secured to the upper end of the button chute trunnion 184 so that the agitator brush is oscillated by the oscillation of the chute. The pinion is clamped against a shoulder on the shaft 216 by a cam lever 222 pivoted on the upper end of the shaft 216. This lever may be turned by the operator to free the pinion from the shaft, and thus permit the brush to be agitated by hand if desired.

The buttons are supplied to the delivery hopper 202 from a large supply hopper 224 arranged at one side of the delivery hopper and communicating therewith through a supply opening 226 arranged in the side wall of the delivery hopper above and out of line with the delivery opening 204. With this construction and arrangement a large supply of buttons may be carried in the supply hopper 224 and be gradually delivered into the delivery hopper 202 without packing the buttons closely in the delivery hopper, or in such manner as to clog or interfere with the agitation of the buttons within the delivery hopper by the agitator brush. Since the supply opening through which the buttons pass to the delivery hopper is formed in the side of the delivery hopper, and out of line with the delivery opening through which the buttons are fed to the chute, the buttons will not completely fill the delivery hopper, and as the space within the hopper is comparatively small, the loose mass of buttons will not press upon the agitator in such manner as to interfere with its proper and efficient action. The upper rear wall of the supply hopper is preferably so shaped that it will retain the buttons within the hopper when the frame of the machine is tipped up to give access to the cam shaft and parts carried by the machine base.

The cam shaft 16 of the machine is driven from a drive shaft 228 provided with a pinion 230 engaging the gear 144 on the cam shaft. As shown, the pinion is one-fourth the diameter of the gear, so that the driving shaft makes four revolutions for each revolution of the cam shaft, or for each cycle of the machine. The driving shaft is provided with a fast belt pulley 232 and a stop cam 234 provided with a braking eccentric portion and a stopping depression. The pulley 232 is arranged adjacent to a loose belt pulley 236 mounted on a shaft 238 which is mounted in the base of the machine in line with the drive shaft 228. The stop pin 240 coöperates with the stop cam, and is carried upon an arm 242 secured to a shaft 244 which is pressed in a direction to force the stop pin against the periphery of the stop cam by a spring 246. The stop pin is moved laterally into and out of the path of the stop cam by a forked arm 248 secured to a rock shaft 250 and embracing the end of the arm 242. The rock shaft is forced yieldingly in a direction to bring the stop pin into the path of the stop cam by a torsional spring 252. The driving belt is shifted from one pulley to the other by a belt shifter 254 secured in an arm 256 which is loosely mounted on the rock shaft 250. The belt shifter arm is connected to move with the rock shaft under normal conditions by a key 258 on the shaft which engages a slot in the arm 256 which is of sufficient breadth to allow lost motion between the rock shaft and arm. A torsional spring 260 connected with the arm and with a collar 262 on the shaft holds one side of the slot in engagement with the key under normal conditions. This connection enables the rock shaft to be operated to disengage the stop pin from the stop cam while the belt shifter arm is held in position with the driving belt on the loose pulley, in case it is desired to turn the cam shaft by hand. The means for retaining the driving belt on the loose pulley in the construction shown comprises a latch 264 formed on the end of a rock shaft 266, and adapted to be moved by the operator into or out of engagement with a notch 268 in the end of the belt shifter. The latch shaft may be readily operated through a knurled head 270 secured to the end of the shaft outside the machine base. The rock shaft 250 is operated to shift the stop pin and driving belt through a link 272 connecting the forked arm 248 with one arm of a bell crank lever 274, the other arm of which is connected by a rod 276 with an operating treadle. In order that the driving shaft, whenever started from stopping position by the operator, may always return the cam shaft to stopping position before the machine is stopped, the bell crank lever 274 carries a roll 278 arranged to ride on the periphery of the cam disk 104 and to enter a recess in the disk during the last quarter of each revolution of the cam shaft and each fourth revolution of the driving shaft. In order that the cam shaft may be easily turned by the operator, a shaft 280 is provided which carries a pinion 282 on its inner end engaging the gear 144 and carrying a hand wheel 284 on its upper end.

While it is preferred to employ the specific construction and arrangement of parts shown and described in constructing a machine embodying all the features of the invention in their preferred forms, it will be understood that this specific construction and arrangement of the parts is not essential to the broader features of the invention, but may be varied or modified as found desirable or best suited to the construction and arrangement of the coöperating parts of the machine in which any feature of the invention is to be embodied.

The button supplying and feeding mechanism shown and described is covered by the claims of a divisional application, Serial No. 143,042, filed January 18, 1917.

Having explained the nature and object of the invention, and specifically described one form of machine in which it may be embodied, what is claimed is:—

1. A button attaching machine, having, in combination, button attaching and work feeding mechanisms constructed and operated to attach a series of buttons, and to discontinue the feed upon the occurrence of a " skip " until a button is attached.

2. A button attaching machine, having, in combination, thread handling devices for forming button attaching loops locked by the button constructed and operated to repeat the formation of said loops when a " skip " occurs, and work feeding mechanism dependent for its feeding action upon the attachment of a button.

3. A button attaching machine, having, in combination, an eye pointed needle, mechanism for actuating the needle to pass a primary loop through the eye of a button and a secondary loop through the primary loop outside the eye, means for passing the secondary loop over the button head, a takeup for tightening the loops, and work feeding mechanism dependent for its feeding action upon the attachment of a button.

4. A button attaching machine, having, in combination, button sewing and work feeding mechanisms for attaching a series of spaced buttons constructed and arranged to omit the feed of the work and to withdraw the button attaching loops from the work during a cycle in which a " skip " occurs, and to attach a button and resume the feed during a succeeding cycle.

5. A button attaching machine, having, in combination, button sewing mechanism for passing a primary loop through a button eye and a secondary loop through the primary loop outside the eye and over the button head, a takeup mechanism for actuating the takeup to withdraw the thread from the work during the cycle in which a "skip" occurs, and to maintain it in operative relation to the sewing mechanism preparatory to the succeeding cycle, and means for feeding the work dependent for its feeding action upon the attachment of a button.

6. A button attaching machine, having, in combination, a reciprocating eye pointed needle for passing a primary loop through a button eye and a secondary loop through the primary loop outside the eye, means for passing the secondary loop over the button head, mechanism for moving the needle laterally to feed the work, a tension, a takeup, and mechanism for operating the takeup to maintain tension on the thread leading from the attached button to the needle during the feeding movement of the needle.

7. A button attaching machine, having, in combination, a reciprocating eye pointed needle for passing a primary loop through a button eye and a secondary loop through the primary loop outside the eye, means for passing the secondary loop over the button head, mechanism for moving the needle to feed the work, a tension, a takeup, mechanism for operating the takeup to give up thread for the primary and secondary loops, to tighten the loops, and to draw thread from the tension during the work feeding movement of the needle.

8. A button attaching machine, having, in combination, a reciprocating needle for passing a primary loop through a button eye and a secondary loop through the primary loop outside the eye, looper fingers, mechanism for engaging the fingers with the primary loop and for separating them to spread the loop for the passage of the secondary loop therethrough.

9. A button attaching machine, having, in combination, a reciprocating needle for passing a primary loop through a button eye and a secondary loop through the primary loop outside the eye, looper fingers, mechanism for reciprocating the fingers to take the primary loop and carry it over the path of the secondary loop, and for separating the fingers to spread the loop for the passage therethrough of the secondary loop.

10. A button attaching machine, having, in combination, a reciprocating eye pointed needle, mechanism for moving it laterally between successive reciprocations, looper fingers, mechanism for moving and separating the fingers to take the loop from the needle during its first reciprocation, spread it laterally, and carry it over the path of the needle during its second reciprocation.

11. A button attaching machine, having, in combination, a reciprocating eye pointed needle, mechanism for relatively moving the work and needle laterally between successive reciprocations, looper fingers, and mechanism for moving and separating the fingers to take the loop from the needle during its first reciprocation, spread it and hold it over the path of the needle during its second reciprocation.

12. A button attaching machine, having, in combination, means for passing a primary loop through a button eye and a secondary loop through the primary loop outside the eye, devices constructed and operated to laterally spread the primary loop and also laterally spread the secondary loop and pass it over the button head.

13. A button attaching machine, having, in combination, a reciprocating eye pointed needle for passing a primary loop through a button eye and a secondary loop through the primary loop outside the eye, devices constructed and operated to take and laterally spread the primary loop and also take and laterally spread the secondary loop and pass it over the button head.

14. A button attaching machine, having, in combination, a reciprocating needle for passing a primary loop through a button eye and a secondary loop through the primary loop outside the eye, looper fingers, mechanism for moving and separating the fingers to take and spread the primary loop for the passage of the secondary loop therethrough, and to take and spread the secondary loop for the passage of the button head therethrough.

15. A button attaching machine, having, in combination, a reciprocating needle for passing a primary loop through a button eye and a secondary loop through the primary loop outside the eye, looper fingers, mechanism for advancing the fingers to engage the primary loop, separating them to spread the loop, retracting them to present the loop for the passage of the secondary loop therethrough, closing them, again advancing them to take the secondary loop, separating and further advancing them to carry the secondary loop over the button head.

16. A button attaching machine, having, in combination, a reciprocating needle for passing a primary loop through a button eye and a secondary loop through the primary loop outside the eye, looper fingers for taking the secondary loop, mechanism for separating the fingers to spread the secondary loop, and means for pushing the button through the loop.

17. A button attaching machine, having, in combination, a reciprocating needle for passing a primary loop through a button eye and a secondary loop through the primary loop outside the eye, looper fingers for taking the secondary loop, mechanism for separating the fingers to spread the loop and for thereafter moving them downward and toward each other to carry the loop down over the button head.

18. A button attaching machine, having, in combination, a reciprocating needle for passing a primary loop through a button eye and a secondary loop through the primary loop outside the eye, looper fingers for taking the secondary loop, mechanism for separating the fingers to spread the loop and for thereafter moving them forward, downward and toward each other to carry the loop over and down below the button head as the loop is contracted.

19. A button attaching machine, having, in combination, a reciprocating needle for passing a primary loop through a button eye and a secondary loop through the primary loop outside the eye, looper fingers for taking the secondary loop, mechanism for separating the fingers to spread the loop and for thereafter moving them forward, downward and toward each other to carry the loop over and down below the button head as the loop is contracted, and means for pushing the button through the spread loop.

20. A button attaching machine, having, in combination, a reciprocating needle for passing a primary loop through a button eye and a secondary loop through the primary loop outside the eye, looper fingers for taking the secondary loop, mechanism for moving the fingers away from and toward each other to spread the loop and carry it over the button head, and a takeup coöperating with the fingers to maintain the thread taut as the secondary loop is being taken up.

21. A button attaching machine, having, in combination, a reciprocating needle for passing a primary loop through a button eye and a secondary loop through the primary loop outside the eye, means for spreading the secondary loop transversely of the primary loop and carrying it over the button head, and additional means for pushing the button head toward the bight of the primary loop as the secondary loop is passed over it.

22. A button attaching machine, having, in combination, a reciprocating needle for passing a primary loop through a button eye and a secondary loop through the primary loop outside the eye, means for spreading the secondary loop transversely of the primary loop and carrying it over the button head, and a reciprocating button pusher coöperating with the loop spreading and carrying means.

23. A button attaching machine, having, in combination, a reciprocating needle for passing a primary loop through a button eye and a secondary loop through the primary loop outside the eye, looper fingers for taking the secondary loop, mechanism for separating the fingers to spread the loop and for moving them to carry the loop down over the button head, and a button positioning device for holding the button head in position while the loop is being passed thereover.

24. A button attaching machine, having, in combination, a reciprocating needle for passing a primary loop through a button eye and a secondary loop through the primary loop outside the eye, looper fingers for taking the secondary loop, mechanism for separating the fingers to spread the loop and for moving them to carry the loop down over the button head, and a button pushing and holding device for pushing the button head toward the bight of the primary loop and holding it while the loop is being passed over the button head.

25. A button attaching machine, having, in combination, a reciprocating needle for passing a primary loop through a button eye and a secondary loop through the primary loop outside the eye, looper fingers for taking the secondary loop, mechanism for separating the fingers to spread the loop and for moving them and bringing them together to carry the loop over the button head and retain it as it is being taken up, and a button pusher for pushing the button head toward the bight of the primary loop.

26. A button attaching machine, having, in combination, a button chute, a reciprocating needle for passing a primary loop through the eye of a button in the chute and a secondary loop through the primary loop outside the eye, a button pusher connected with the chute, and mechanism for vibrating the chute to withdraw and push the button.

27. A button attaching machine, having, in combination, a looper carrier, a looper comprising two fingers mounted on the carrier to swing in opposite directions about axes substantially parallel to the plane of movement of the carrier, and mechanism for reciprocating the carrier and swinging the fingers.

28. A button attaching machine, having, in combination, a looper carrier, two looper fingers mounted on the carrier to turn in opposite directions about an inclined axis, and mechanism for reciprocating the carrier and turning the fingers.

29. A button attaching machine, having, in combination, a looper carrier, two concentric shafts mounted one within the other on the carrier, looper fingers on the shafts, and actuating mechanism for the carrier and shafts.

30. A button attaching machine, having, in combination, an oscillating looper carrier, two concentric inclined shafts mounted one within the other on the carrier, looper fingers projecting obliquely from the ends of the shafts, and actuating mechanism for the carrier and shafts.

31. A button attaching machine, having, in combination, a button chute, a reciprocating needle for passing a primary loop through the eye of a button held in the chute and a secondary loop through the primary loop outside the eye, mechanism for moving the needle in the direction of the feed between its primary and secondary strokes, mechanism for retracting the chute to remove the button therefrom, and means for spreading and passing the secondary loop over the button head.

32. A button attaching machine, having, in combination, button feeding mechanism, button sewing mechanism, and means for feeding the work by engagement with the thread leading from the attached button.

33. A button attaching machine, having, in combination, a reciprocating needle for passing a primary loop through the eye of a button and a secondary loop through the primary loop outside the eye, means for passing the secondary loop over the button head, and means for pulling on the thread below the work to feed the work.

34. A button attaching machine, having, in combination, a reciprocating needle for passing a primary loop through the eye of a button and a secondary loop through the primary loop outside the eye, and mechanism for moving the needle while disengaged from the work to apply a work feeding pull to the thread leading from the attached button.

35. A button attaching machine, having, in combination, a reciprocating needle and coöperating devices for forming button attaching loops, mechanism for moving the needle while disengaged from the work to apply a work feeding pull to the thread leading from the attached button, and means for maintaining the thread taut during the work feeding movement of the needle.

36. A button attaching machine, having, in combination, button attaching mechanism, work feeding mechanism including a feed arm, the stroke of which determines the feed, a feed cam, yielding connections between the feed cam and feed arm, and an adjustable stop for determining the feeding stroke of the feed arm.

37. A button attaching machine, having, in combination, a vertically reciprocating hollow needle bar and an eye pointed needle secured therein provided with a longitudinal thread groove leading from the interior of the bar to the eye.

38. A button attaching machine, having, in combination, a reciprocating eye pointed needle provided with a thread groove leading to the eye on the supply side only, mechanism for actuating the needle to pass a primary loop through a button eye and a secondary loop through the primary loop outside the eye, a takeup, and means for actuating the takeup independently of the reciprocation of the needle to give up thread to the needle for the secondary loop.

39. A button attaching machine, having, in combination, a vertically reciprocating and laterally movable needle bar, a substantially horizontal lever to which the lower end of the needle bar is pivoted, a cam for oscillating the lever, a substantially vertical arm, a substantially horizontal link connecting the upper end of the needle bar with the vertical arm, and a cam for actuating the vertical arm.

40. A button attaching machine, having, in combination, a reciprocating eye pointed needle for passing a primary loop through the eye of a button and a secondary loop through the primary loop outside the eye, means for passing the secondary loop over the button head, a tension, a takeup over which the thread passes freely from the tension to the needle, mechanism for operating the takeup to give up thread to the needle for the primary and secondary loops and to take up the loops against the resistance of the tension and draw thread through the tension for the succeeding loops.

41. A button attaching machine, having, in combination, a reciprocating eye pointed needle for passing a primary loop through the eye of a button and a secondary loop through the primary loop outside the eye, a tension, a takeup over which the thread passes freely from the tension to the needle, mechanism for operating the takeup to give up thread to the needle for the primary and secondary loops, to take up the primary loop preparatory to passing a secondary loop over the button head, and to take up the secondary loop and draw thread through the tension for the succeeding primary and secondary loops.

42. A button attaching machine, having, in combination, a vertically reciprocating hollow needle bar through which the thread passes to the needle, mechanism for swinging the bar laterally to feed the work, a takeup, and actuating mechanism for the takeup connected with the needle bar swinging mechanism to vary the action of the takeup in accordance with the feed.

43. A button attaching machine, having, in combination, a vertically reciprocating needle bar, mechanism for swinging the bar laterally to feed the work, a takeup, and connections between the takeup and feed mechanism for actuating the takeup to take up thread during the feeding movement of the bar and to give up thread during the return movement of the bar.

44. A button attaching machine, having, in combination, a vertically reciprocating needle bar along which the thread leads to the needle, mechanism for swinging the bar to feed the work, a takeup, mechanism for actuating the takeup to take up the loops passed through the work by the needle, and connections between the takeup and needle bar swinging mechanism for actuating the takeup.

45. A button attaching machine, having, in combination, a vertically reciprocating needle bar along which the thread leads to the needle, an oscillating feed arm connected to swing the needle bar laterally, a takeup lever, an actuating lever on which the takeup lever is mounted, and a link connecting the takeup lever and feed arm.

46. A button attaching machine, having, in combination, a vertically reciprocating needle bar along which the thread leads to the needle, an oscillating feed arm connected to swing the needle bar laterally, a takeup lever, an actuating lever on which the takeup lever is mounted, a link connecting the take up lever and feed arm, and means for adjusting the throw of the feed arm.

47. A button attaching machine, having, in combination, a vertically reciprocating hollow needle bar through which the thread leads to the needle, mechanism for actuating the bar to form button attaching loops, and a vertically movable takeup below the lower end of the bar.

48. A button attaching machine, having, in combination, a vertically reciprocating needle bar carrying a needle, devices cooperating therewith to pass a primary loop through a button eye and a secondary loop through the primary loop outside the eye, a lever to which the lower end of the bar is directly pivoted, a cam for rocking the lever to vertically reciprocate the bar, a support for the upper end of the bar, and a cam and connections for moving the support laterally to swing the bar about its lower pivot.

49. A button attaching machine, having, in combination, a vertically reciprocating needle bar carrying a needle, devices coöperating therewith to pass a primary loop through a button eye and a secondary loop through the primary loop outside the eye, a lever to which the lower end of the bar is directly pivoted, a cam for rocking the lever to vertically reciprocate the bar, a support for controlling the movement of the upper end of the bar, a substantially vertical arm pivotally connected to the support, and a cam for operating the arm.

50. A button attaching machine, having, in combination, a presser foot, a work clamp slotted in the direction of feed, a vertically reciprocating needle bar provided with an eye pointed needle for passing a primary loop through a button eye and a secondary loop through the primary loop outside the eye, a spring supported needle guard mounted on the needle bar and constructed to enter the slot in the work clamp and to engage the under side of the work during the reciprocation of the needle bar.

51. A button attaching machine, having, in combination, a presser foot, a work clamp slotted in the direction of feed, a vertically reciprocating needle bar provided with an eye pointed needle for passing a primary loop through a button eye and a secondary loop through the primary loop outside the eye, a spring supported bar mounted to slide vertically in the needle bar, a needle guard on the upper end of the slide bar adapted to enter the slot in the work clamp and engage the under side of the work during the reciprocation of the needle bar.

52. A button attaching machine, having, in combination, a presser foot and work clamp coöperating to hold the work in fixed position during the button attaching cycle, a reciprocating needle and coöperating thread handling devices for forming button attaching loops locked by the button, a takeup, and mechanism for operating the takeup to tighten the loops during the button attaching cycle and to coöperate with the needle and thread handling devices in repeating the formation and tightening of the loops in a cycle succeeding that in which a "skip" occurs.

53. A button attaching machine, having, in combination, a button chute, a reciprocating needle for passing a primary loop through the eye of the button held in the chute and a secondary loop through the primary loop outside the eye, mechanism for moving the needle in the direction of the feed between its primary and secondary strokes, mechanism for relatively moving the needle and chute in the line of feed to remove the button, and means for spreading and passing the secondary loop over the button head.

54. A button attaching machine, having, in combination, a presser foot provided on its upper side with a button alining trough, a reciprocating needle for passing a primary loop through the eye of a button and a secondary loop through the primary loop outside the eye, mechanism for moving the needle in the direction of feed between its primary and secondary strokes, means for presenting a button with its eye in position for passage therethrough of the primary loop and for thereafter delivering the button to the alining trough, and means for spreading the secondary loop transversely of the trough and for passing it over the head of the button.

55. A button attaching machine, having, in combination, a reciprocating needle for passing a primary loop through the eye of a button and a secondary loop through the primary loop outside the eye, mechanism for moving the needle in the direction of the feed between its primary and secondary strokes, and means for spreading the secondary loop transversely of the feed and for carrying the spread loop over the button head in a direction opposite to the direction of feed.

56. A button attaching machine, having, in combination, a vertically reciprocating and laterally movable needle bar, a vertically reciprocating support to which the lower end of the bar is pivoted, a vertically and laterally movable support pivotally connected to the needle bar, and mechanism for reciprocating the former support and for laterally moving the latter support.

57. A button attaching machine, having, in combination, a vertically reciprocating and laterally movable needle bar, a vertically oscillating lever to which the lower end of the bar is pivoted, a link having one end pivoted to the bar, and mechanism for laterally moving the link.

58. A button attaching machine, having, in combination, button attaching mechanism, work feeding mechanism including a feed arm the stroke of which determines the feed, an actuating lever having a constant throw, connections between the feed arm and lever for permitting independent movement of the lever upon the arrest of the feed arm, and an adjustable stop for determining the feeding stroke of the feed arm.

59. A button attaching machine, having, in combination, a vertically reciprocating and laterally movable needle bar, a feed arm connected to move the bar laterally, a cam for actuating the feed arm, yielding connections between the cam and feed arm, and an adjustable stop for determining the feeding stroke of the feed arm.

60. A button attaching machine, having, in combination, a button holder, a reciprocating eye-pointed needle for passing a primary loop through the eye of a button in the holder and a secondary loop through the primary loop outside the eye, means for removing the button from the holder, means for drawing the primary loop down against the work to position the button, and means for thereafter passing the secondary loop over the head of the button.

61. A button attaching machine, having, in combination, a reciprocating eye-pointed needle for passing a primary loop through a button eye and a secondary loop through the primary loop outside the eye, and devices for taking and spreading the secondary loop for the passage of the button therethrough so arranged and operated with relation to the needle that the pull on the thread leading from the devices to the needle is approximately lengthwise of the needle during the loop spreading.

62. A button attaching machine, having, in combination, a reciprocating eye-pointed needle for passing a primary loop through a button eye and a secondary loop through the primary loop outside the eye, devices for taking and spreading the secondary loop, and mechanism for operating the devices to spread the loop after the needle has so far retracted that the pull of the thread thereon is approximately lengthwise of the needle during the spreading.

63. A button attaching machine, having, in combination, a reciprocating eye-pointed needle for passing a primary loop through a button eye and a secondary loop through the primary loop outside the eye, devices for taking the secondary loop, and mechanism for operating the devices to spread the loop after the needle has retracted below the devices and to carry the loop over the button head after the needle has withdrawn below the upper surface of the work.

64. A button attaching machine, having, in combination, a reciprocating eye-pointed needle for passing a primary loop through a button eye and a secondary loop through the primary loop outside the eye, looper fingers, and mechanism for moving and separating the fingers to engage the secondary loop and spread it for the passage of the button therethrough.

65. A button attaching machine, having, in combination, a reciprocating eye-pointed needle for passing a primary loop through a button eye and a secondary loop through the primary loop outside the eye, looper fingers, and mechanism for moving and separating the fingers to take the secondary loop from the side of the needle during its second reciprocation, spread it, and carry it over the button head.

66. A button attaching machine, having, in combination, a reciprocating eye-pointed needle for passing a primary loop through a button eye and a secondary loop through the primary loop outside the eye, means for spreading the secondary loop, and means for pushing the button through the loop after the needle has retracted below the path of the button head.

67. A button attaching machine, having, in combination, a reciprocating eye-pointed needle for passing a primary loop through a button eye and a secondary loop through the primary loop outside the eye, devices for spreading the secondary loop, and means for pushing the button through the loop after the needle has withdrawn below the path of the button head.

68. A button attaching machine, having, in combination, a reciprocating eye-pointed needle for passing a primary loop through a button eye and a secondary loop through the primary loop outside the eye, devices for spreading the secondary loop, mechanism for operating the devices to spread the loop during the retraction of the needle, and means for pushing the button through the loop after the needle has withdrawn below the path of the button head.

69. A button attaching machine, having, in combination, a reciprocating eye-pointed needle for passing a primary loop through a button eye and a secondary loop through the primary loop outside the eye, devices for spreading the secondary loop transversely of the primary loop, and means for pushing the button through the spread loop.

70. A button attaching machine, having, in combination, a reciprocating eye pointed needle for passing a primary loop through a button eye and a secondary loop through the primary loop outside the eye, means for taking the primary loop and presenting it for the passage of the secondary loop therethrough, means for taking and spreading the secondary loop transversely of the primary loop, and means for pushing the button through the spread loop.

71. A button attaching machine, having, in combination, a presser foot provided with a button alining trough, a reciprocating eye-pointed needle for passing a primary loop through a button eye and a secondary loop through the primary loop outside the eye, means for presenting the primary loop for the passage of the secondary loop therethrough, means for drawing the primary loop down against the work to position the button in the trough, and means for spreading the secondary loop after the needle has retracted below the bight of the loop and for passing the loop over the button head.

BERNARD T. LEVEQUE.